(12) United States Patent
Avedissian

(10) Patent No.: US 8,595,057 B2
(45) Date of Patent: Nov. 26, 2013

(54) SYSTEM FOR APPORTIONING REVENUE BASED ON CONTENT DELIVERY BY AN ONLINE COMMUNITY

(76) Inventor: Narbeh Avedissian, Studio City, CA (US)

( * ) Notice: Subject to any disclaimer, the term of this patent is extended or adjusted under 35 U.S.C. 154(b) by 1770 days.

(21) Appl. No.: 11/687,658

(22) Filed: Mar. 18, 2007

(65) Prior Publication Data

US 2008/0040235 A1 Feb. 14, 2008

Related U.S. Application Data

(63) Continuation-in-part of application No. 11/549,027, filed on Oct. 12, 2006.

(60) Provisional application No. 60/836,465, filed on Aug. 8, 2006.

(51) Int. Cl.
*G06Q 30/00* (2012.01)

(52) U.S. Cl.
USPC .................. 705/14.1; 705/14.23; 705/14.31; 705/14.32; 705/26.1

(58) Field of Classification Search
USPC ........ 705/14.4, 14.49, 14.16, 14.2, 14.52, 26, 705/26.1, 14.1, 14.23, 14.31, 14.32
See application file for complete search history.

(56) References Cited

U.S. PATENT DOCUMENTS

| | | | |
|---|---|---|---|
| 5,774,869 A * | 6/1998 | Toader | 705/10 |
| 5,911,131 A * | 6/1999 | Vig | 705/29 |
| 5,913,204 A | 6/1999 | Kelly | |
| 6,029,141 A * | 2/2000 | Bezos et al. | 705/27 |
| 6,073,127 A | 6/2000 | Lannert et al. | |
| 6,216,112 B1 * | 4/2001 | Fuller et al. | 705/14.19 |
| 6,248,946 B1 * | 6/2001 | Dwek | 84/609 |
| 6,317,881 B1 | 11/2001 | Shah-Nazaroff et al. | |
| 6,343,313 B1 | 1/2002 | Salesky et al. | |
| 6,530,082 B1 | 3/2003 | Del Sesto et al. | |
| 6,968,243 B1 | 11/2005 | Oh | |
| 7,069,310 B1 | 6/2006 | Bartholomew | |
| 7,076,434 B1 | 7/2006 | Newman et al. | |
| 7,080,139 B1 | 7/2006 | Briggs et al. | |
| 7,162,433 B1 | 1/2007 | Foroutan | |
| 2002/0103695 A1 | 8/2002 | Urken et al. | |
| 2002/0143607 A1 | 10/2002 | Connelly | |
| 2002/0198723 A1 * | 12/2002 | Mowry | 705/1 |
| 2003/0036944 A1 * | 2/2003 | Lesandrini et al. | 705/10 |

(Continued)

FOREIGN PATENT DOCUMENTS

WO WO 9952056 A1 * 10/1999

OTHER PUBLICATIONS

Craig Havighurst, "Webcasters say proposed royalty rate will put them out of business" : Byline (Business; p. 1E): Jul. 1, 2002.*

(Continued)

*Primary Examiner* — John G Weiss
*Assistant Examiner* — Adam Chornesky
(74) *Attorney, Agent, or Firm* — Knobbe, Martens, Olson & Bear LLP

(57) ABSTRACT

Uses media, for example audio, video or text performances that were integrated into an online community for feedback determinative of outcome, for digital distribution. Apportions compensation for a selected artist from revenue that may be generated through one or any combination of advertisement, services associated with artist's performance, and media sales. The media may include singing, instrumental music, rhythmic music, videos, and writings.

20 Claims, 2 Drawing Sheets

(56) References Cited

U.S. PATENT DOCUMENTS

| | | |
|---|---|---|
| 2003/0079015 A1 | 4/2003 | Fein et al. |
| 2003/0149574 A1 | 8/2003 | Rudman |
| 2003/0171982 A1 | 9/2003 | Paul |
| 2003/0187802 A1 | 10/2003 | Booth |
| 2004/0003097 A1 | 1/2004 | Willis et al. |
| 2004/0015427 A1* | 1/2004 | Camelio .................. 705/35 |
| 2004/0093236 A1* | 5/2004 | Chacker .................. 705/1 |
| 2005/0071865 A1 | 3/2005 | Martins |
| 2005/0120389 A1 | 6/2005 | Boss et al. |
| 2005/0246377 A1 | 11/2005 | Faso |
| 2005/0251399 A1 | 11/2005 | Agarwal et al. |
| 2005/0276246 A1 | 12/2005 | Walker et al. |
| 2006/0026593 A1 | 2/2006 | Canning et al. |
| 2006/0106675 A1* | 5/2006 | Cohen et al. .................. 705/26 |
| 2006/0143068 A1 | 6/2006 | Calabria |
| 2006/0149681 A1 | 7/2006 | Meisner |
| 2006/0155575 A1 | 7/2006 | Gross |
| 2006/0212367 A1 | 9/2006 | Gross |
| 2006/0218153 A1 | 9/2006 | Voon et al. |
| 2006/0229993 A1 | 10/2006 | Cole |
| 2006/0242139 A1 | 10/2006 | Butterfield et al. |
| 2006/0242269 A1 | 10/2006 | Gross |
| 2006/0253599 A1 | 11/2006 | Monteiro et al. |
| 2006/0292541 A1 | 12/2006 | Ehmann |
| 2007/0044639 A1* | 3/2007 | Farbood et al. .................. 84/609 |
| 2007/0156507 A1* | 7/2007 | Connelly et al. .................. 705/10 |
| 2007/0243509 A1* | 10/2007 | Stiebel .................. 434/236 |
| 2007/0294177 A1 | 12/2007 | Volk et al. |
| 2008/0034066 A1 | 2/2008 | Shamus et al. |
| 2008/0050713 A1 | 2/2008 | Avedissian |
| 2008/0050714 A1 | 2/2008 | Avedissian |
| 2008/0104626 A1 | 5/2008 | Avedissian |
| 2008/0104627 A1 | 5/2008 | Avedissian |
| 2008/0262931 A1* | 10/2008 | Chan et al. .................. 705/14 |
| 2009/0287532 A1* | 11/2009 | Cohen et al. .................. 705/9 |

OTHER PUBLICATIONS

Raoul V. Mowatt, in "Web radio royalty rate Postponed" (Metro; Zone: N; p. 2): May 22, 2002.*

DialogSrch Jul. 11, 2013; Examiner Dialog search conducted Jul. 11, 2013.*

Webpage from www.MySpace.com, Selecting MySpace Music; captured Aug. 9, 2007, original publication date Unknown.

Webpage from www.MySpace.com, Selecting MySpace Ringtones; captured Aug. 9, 2007, original publication date Unknown.

Webpage from www.YouTube.com, Selecting YouTube Community; captured Aug. 9, 2007, original publication date Unknown.

Webpage from www.YouTube.com, Selecting YouTube Contests; captured Aug. 9, 2007, original publication date Unknown.

Webpage from www.IdolUnderground.com, Selecting homepage; captured Aug. 9, 2007, original publication date Unknown .

Webpage from www.IdolUnderground.com, Selecting Idol Underground Competitions; captured Aug. 9, 2007, original publication date Unknown.

Webpage from www.MusicNation.com, Selecting homepage; captured Aug. 9, 2007, original publication date Unknown.

"What is Tonos?", pp. 1-3, http://www.tonos.com/app2/tonos/jsp/what_is_tonos.jsp, 2001-2002.

www.talentnetworks.com, 53 pages, Jun. 12, 2003.

* cited by examiner

SYSTEM FOR APPORTIONING REVENUE BASED ON CONTENT DELIVERY BY AN ONLINE COMMUNITY

The present application is a continuation in part of U.S. Utility patent application Ser. No. 11/549,027 filed Oct. 12, 2006 which takes benefit from U.S. Provisional Patent Application Ser. No. 60/836,465, filed Aug. 8, 2006, the specifications of which are both hereby incorporated herein by reference.

BACKGROUND OF THE INVENTION

1. Field of the Invention

The invention relates to the field of computer software and is more particularly, but not by way of limitation, directed to a system and method for selecting an artist meeting a certain threshold of votes and apportioning revenue derived from services associated with artist's performance data, and distribution of advertisement and artist's media content.

2. Description of the Related Art

There are numerous online social networking and communities that provide users with an interface for interacting with other users. In some cases, online social networking is combined with offline elements such as face-to-face events. The ability of users to buy products, obtain information from online services is revolutionizing the way business is done. The importance of the Internet as a tool of electronic commerce cannot be overstated.

Although the existing social networks are powerful tools for interacting with people who have similar interests, such communities are not organized for users who hold themselves out as having artistic talent to receive a part of revenue generated derived from byproducts of their artistic talent and popularity. There is a need for a system to select artists meeting a certain threshold of feedback and apportioning revenue derived from services based on network traffic associated with artist's performance data, and distribution of advertisement and artist's media content. Embodiments of the invention enable an opportunity for the independent community to utilize a platform that allows for monetization despite the impossible threshold of penetration into the major label and studio system that is run by a few tastemakers who select content for the masses. This allows a platform for independent artists to exploit their art and have a community of consumers/end users democratically determine what content they want to see more of. Hence, embodiments of the invention benefit the consumer and the independent artist, not the major labels and studios. Although a small percentage of artists are successful in penetrating the major label/studio system, embodiments of the invention provides a system that allows all artists to avail their content for the actual consumer to say yes or no and actually monetize immediately as opposed to waiting and hoping that an executive at one of the majors thinks they have what it takes. For at least these reasons, there is a need for a system for apportioning revenue for media content derived from an online feedback community.

BRIEF SUMMARY OF THE INVENTION

One or more embodiments of the invention are directed to a system and method for providing one or more services to an artist or a group of artists (hereinafter "artist") meeting a certain threshold of feedback and apportioning revenue derived from services associated with artist's performance, and distribution of advertisement and artist's media content. The general methodology involves obtaining information about an artist and obtaining performance data associated with the artist. In certain embodiments, the performance data is a media file (e.g., audio, video, and/or text or any combination thereof). Once obtained this performance data is then exposed to the community for feedback in a manner that is determinative of the outcome associated with a particular artist. The community in general is formed from peers and other artists that generally have an interest in the artist's activities of genre but may also comprise users who enjoy participating in an online community where new artist content is plentiful. After meeting a certain threshold of feedback from the online community, a decision is made to extend an offer to the artist. Such offer may include one or more services to promote the artist, distribute the artist's performance data, and allow for revenue participation associated with such service. Another aspect relates to the administration and monetization of methods of use of the submitted performance data and/or artist's performance activity. In certain embodiments, the submitted performance data may be licensed for use by third parties for distribution through offline channels such as cell phones, podcasts, cable television, satellite television, and/or broadcast television. The submitted performance data may be licensed for reproduction on DVDs, videotapes and/or other formats for sale by the licensee. In embodiments, the artist would be able to opt-in to any licensing program.

Various types of artist activities benefit from use in association with one or more embodiments of the invention. As such, artist activities and are not limited solely to the performing arts but should be viewed as any creative activity that gives rise to a user base when made available online. In addition to music, video and other performances works of authorship such as blogs or other online commentary may be considered an artist activity.

The online community determines what artist activities should be further produced and provides the producing artist (s) to share in the advertising and other possible revenue streams once approval has been given. The invention enables the online community to control a performance's rise in popularity and enables one or more sources of revenue generated from the outcome associated with a particular artist. When a decision is made to select an artist, one or more services and associated revenue participation may be extended to artist. Such services includes, but not limited to, advertisement placement, marketing, sponsorship, touring, licensing, extensions to artist website/page, and/or distribution of artist's performance data. Some aspects of the service may include either offline and online elements, or both. The artist's submitted performance data may then be optionally offered for free or for sale. For example, sales occur in such cases where the system for obtaining media data or performance data is separate from a purchasing system. Submitted data can be synchronized with the purchasing system so that it becomes accessible for sale. The artist receives a portion of revenue generated through one or more services and the portion may be a fixed percentage or a percentage based on a sliding scale that adjusts automatically to the revenue generated from the services related to the artist performance data. This sliding scale is unique to advertising revenue participation and is an indirect measure of the artist's popularity. This enables an artist to receive revenue in free download environments and provides additional revenue to the artist in pay for download venues.

Embodiments in which submitted performance data meeting a certain threshold of feedback and then provided through a service might be viewed as providing a rich example of the variety of possibilities for optimal revenue participation and for the ability to relate such revenues directly to the service.

Users might pay a fee for the service, pay on a subscription basis, pay per show, pay per download, or pay on some other basis. Advertisers, sponsors, or programmers might pay for such service and allow users, for example, to view submitted performance data for free. In other embodiments users are given everything but music and video downloads for free. Optionally revenue may be shared with users who generate business or traffic to the system by referring users and getting more and more referred business from artists and users.

Advertisers find the ability to couple advertisement with the artist's performance data to be very valuable, and might be expected to pay for such services based on criteria such as number of ad viewings for which viewing is possible (perhaps in a manner analogous to Web ad impressions, pay-per-impression), number for which advertisement a link is activated (perhaps in a manner analogous to click-throughs, pay-per-click), number of activations (such as if multiple activation opportunities per ad are provided, and also analogous to click-throughs), number of leads obtained (pay-per-lead), number of transactions completed (pay-per-transaction), or other such variations. Many of these and similar pricing schemes might be applicable to embodiments providing offline service as well, such as including advertisement in touring or live performance venue. A proportionate share of revenue for example can be paid out to an artist for performances conducted offline if that artist is one selected by the community. Hence television shows, plays, and any other type of performances that occur offline may still trigger a proportionate payment to the artist if the performing artist was initially chosen by the online community or viewers whose votes triggered the artist to be signed with a representative such as a record label or other entity promoting the artists work. In at least one embodiment of the invention, having been chosen by the community itself is not determinative of being able to obtain a proportionate share of revenue. An artist that becomes increasingly popular in the community as judged by page views, number of friends, fans or some other measure of popularity may obtain the same status as one originally elected by the community once a certain threshold is reached. An artist or user, for example, that has 1 million page views may qualify for a proportionate share of revenue on advertising, items sold and promoted on their personal profile page.

Submitted performance data can be optionally made available for distribution on a service as a ring tone data or a general media file that can be downloaded into a cell phone, media playable device, or other computation device where use of such files might be applicable. In the instance where the performance data is video, a user may download the video data for purchase via online distribution channels or be bought on various media through a third party distribution network.

By apportioning revenue with artist, artist has an incentive to provide performance data and refer users and other artists to the system. This helps the system build a network including an unlimited number of advertisers, getting more and more referred business from artists and users. At the same time, the system can reduce its own advertising ventures and expenses. Furthermore, through the use of user account, the system can apportion revenue with artist and end users, and for each of its various online sites that sell intangible and tangible items.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

Figure 1:
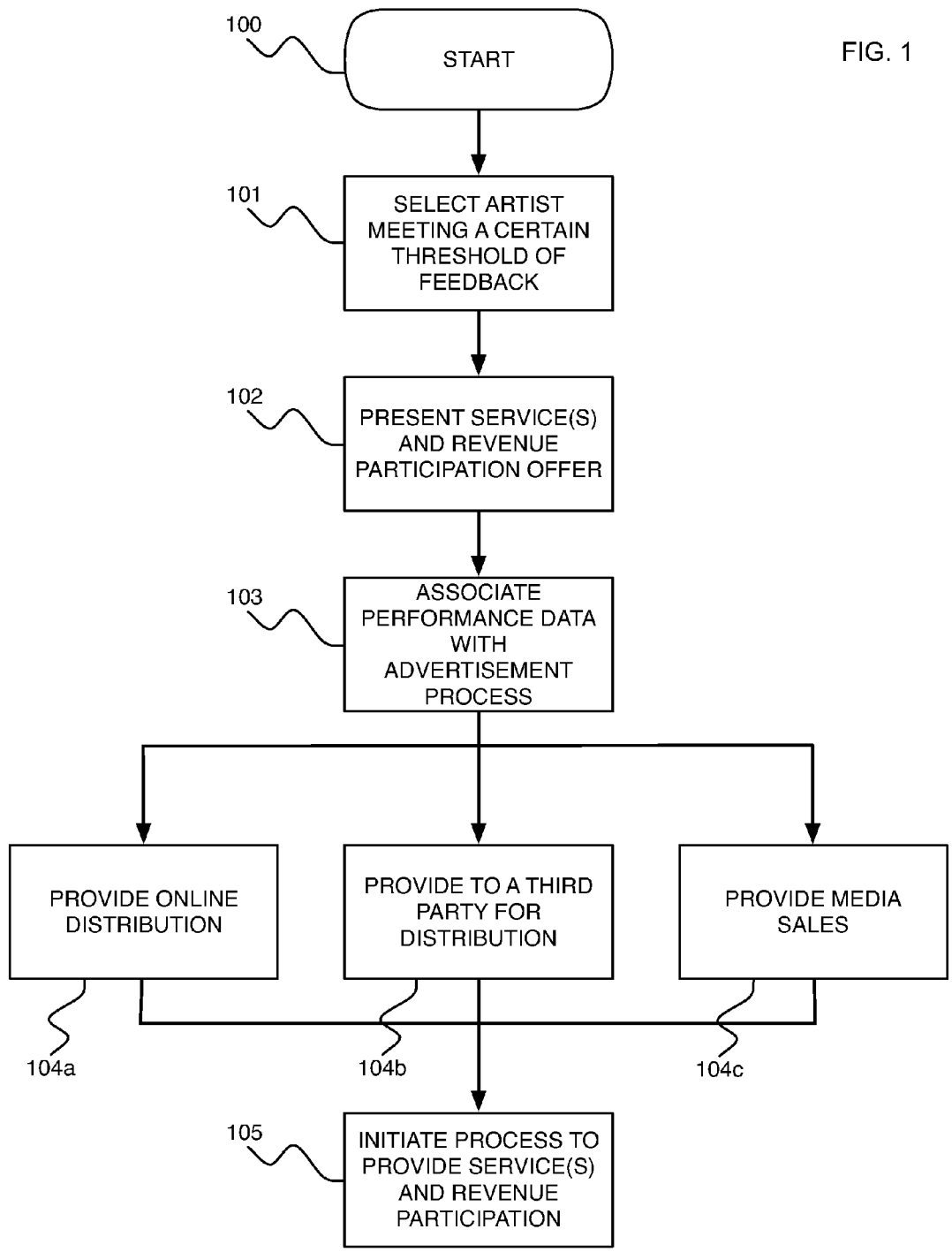
FIG. 1 is a flow diagram that illustrates the process for providing one or more services to artist meeting a certain threshold of feedback, apportionment of revenue derived from the services related to artist's performance activities and distribution of submitted performance data in accordance with one or more embodiments of the invention.

One or more embodiments of the invention are directed to a system and method for providing one or more services to artist meeting a certain threshold of feedback and apportion revenue derived from the services related to artist's performance activities and distribution of performance data. The description set forth herein is exemplary, rather than limiting, and many variations and modifications are within the scope and spirit of the invention. Although numerous specific details are set forth in order to provide a thorough understanding of the present invention, it will be apparent to one of ordinary skill in the art, that embodiments of the invention may be practiced without these specific details. In other instances, well-known features have not been described in detail in order to avoid unnecessarily obscuring the present invention.

The general methodology for obtaining and synchronizing performance data involves obtaining information about an artist and obtaining performance data associated with the artist. The term performance data refers to any artistic performance captured within a tangible medium such as computer memory. Such performances are typically recorded in audio or video form prior to or simultaneous with submission to the community. Although the example given here is discussed in the context of a musical performance readers should note that embodiments of the invention are equally applicable to other types of performances such as acting performances, comedy performance, dancing performances, video performances or works of art such as drawings, paintings or other visual renditions made by an artist.

Information related to the artist may be obtained in any manner including via telephonic communication or website based communication. Likewise, media such as performance data may be obtained over a telecommunication medium including a wireless or wire based telephone channel, or over an Internet based telephone channel for example. For example, personal profile pages employed by one or more embodiments of the invention allow for users to use a VoIP communication link (e.g., Skype™) to talk with friends and stream their playlist and content across the link. When an artist's performance is captured in video form that video and the accompanying audio data may be uploaded to the community for determination as to the popularity of the performance data. In addition, embodiments of the invention enable a user to create their own custom radio station on their personal profile page with their own playlist/content they may webcast from their personal page. Any method for users to access the custom station is in keeping with the spirit of the invention, including RSS, podcasting, email, text messaging, via a search engine or in any other manner.

In certain embodiments of the invention, services available to artist may include one or any combination of media production, marketing, artist management, sponsorship, media or performance data distribution, touring, and licensing. Service may be online and automated by a server process where providing such service through the server is applicable such as online distribution of submitted performance data. Other services may depend on an external intermediary such as a business manager or agent who provides the service initiated by a server process using a technological mean (e.g. email, user interface notification). Where online interfacing is applicable, presenting aspects of service to a user can be implemented using any graphical user interface or web interface configured to obtain data from a server and present the data. Any form of monetization arising from advertisements during the service provided to artist may be shared with the artist.

FIG. 1 is a flow diagram that illustrates the system for providing one or more services to artist meeting a certain threshold of feedback and apportion of revenue derived from the services related to artist's performance activities and distribution of submitted performance data in accordance with one or more embodiments of the invention. Processing typically occurs on a server coupled to a data repository and to a global communication network, which begins at 100. For a performance data exposed to the community for feedback in a manner that is determinative of the outcome associated with a particular artist, at step 101 the artist is selected on reaching a predetermined threshold condition or value of feedback generated from community rankings and feedback mechanisms. Any manner of determining a threshold condition or value for selecting artist including relative or fixed number of feedback, or qualitative or quantitative feedback condition is in keeping with the spirit of the invention. For example, but not limited to, selection of artist may occur upon reaching a threshold condition or value such as, e.g., 'when the ranking of submitted performance on a genre within the music category reaches Top 10,' or 'when the positive feedback on submitted performance data for a sub-category within the video category exceed 32% of the size of the registered users,' or 'when the artist is voted as a winner of an audition,' etc. Selection may take place periodically, e.g., weekly, or quarterly.

Revenue participation and service offer is presented at 102. Embodiments of the invention that present offers to a user can be implemented using any graphical user interface or web interface configured to obtain data from a server and present the data to a plurality of users. For instance a Skype™ or other such interface may provide a free interface between users and artist. The presentation of offers allows a selected artist to opt into one or more service. An offer may be dynamically generated prior to presentation depending on availability of one or more service and whether the service has a different threshold value or condition. For example, an additional service may be available for artist reaching a higher threshold value or condition. Services may also depend on a condition, which is recorded in a database, as set up by advertisers, sponsors, or programmers seeking a certain target audience. The selected artist is offered compensation from the revenue generated from advertisement on the artist or affiliate page and/or sale of any media with the submitted performance data. Advertisements may be in any form and include but are by no means limited to online advertisements. Video, image and other types of ads are in keeping with the spirit of the invention. Upon accepting an offer, artist's user account is configured to associate with a revenue participation process.

After presentation, submitted performance data is associated with advertisement process at 103. The advertisement process controls and tracks the instances or scores for viewing of advertisement retrieved from a data repository and displayed with the media contents of artist or affiliate page on the system. The advertisement process is coupled with the revenue participation process, which records the instances or scores of viewing advertisement on the user account of selected artist. In one embodiment of the invention popularity is determined by votes rather than a ranking although both alternatives are feasible. For advertisement on an offline service, advertisement media may be coupled with performance data or be displayed at a venue for artist's performance, such as a banner at the concert during artist touring or previewing advertisement video on media containing video of the submitted performance data. Keeping in the spirit of the invention to enable the revenue participation, any process that allows tracking of instances of advertisement such as number of ad viewings for which viewing is possible, number for which advertisement link is activated, number of activations, number of leads obtained, number of transactions completed, or other such variations.

Distribution of submitted performance data occurs at one or any combination of providing online distribution, providing to third party for distribution, and providing media sales at steps 104a, 104b, and 104c respectively. Submitted performance data may be synchronized with a purchasing system so that it becomes accessible. In another embodiment, submitted performance data may be available for free on online distribution 104a coupled with advertisement placement which in turn generates revenue using methods discussed herein. In these instances where the performance data is video, user may upload the video data for purchase via the Internet or be bought on various media through a third party distribution network. In these embodiments, the submitted performance data may be licensed for use by third parties for distribution through offline channels such as cell phones, podcasts, cable television, satellite television, and/or broadcast television. The licensee may license the submitted performance data for reproduction on DVDs, videotapes and/or other formats for sale.

Process to provide one or more service and associated revenue participation is enabled at 105. System may execute one or more processes to provide service and revenue participation as optioned by selected artist in the step 102. The revenue participation process tracks one or more revenue-generating activities (e.g. advertisement, distribution of artist's performance data, licensing, sponsorship, and touring) and apportions a percentage of revenue to the selected artist's user account. In certain embodiments, the service process may route email or establish telephone communication between a service provider intermediary and artist thus initiating the service, which is then provided to the artist by the service provider intermediary. For example, the process may notify a business manager by email via a global communication network to secure sponsorship for a selected artist. Such service provided by a service provider includes media production, marketing, artist management, sponsorship, trading or distribution, touring, and licensing.

Figure 2:
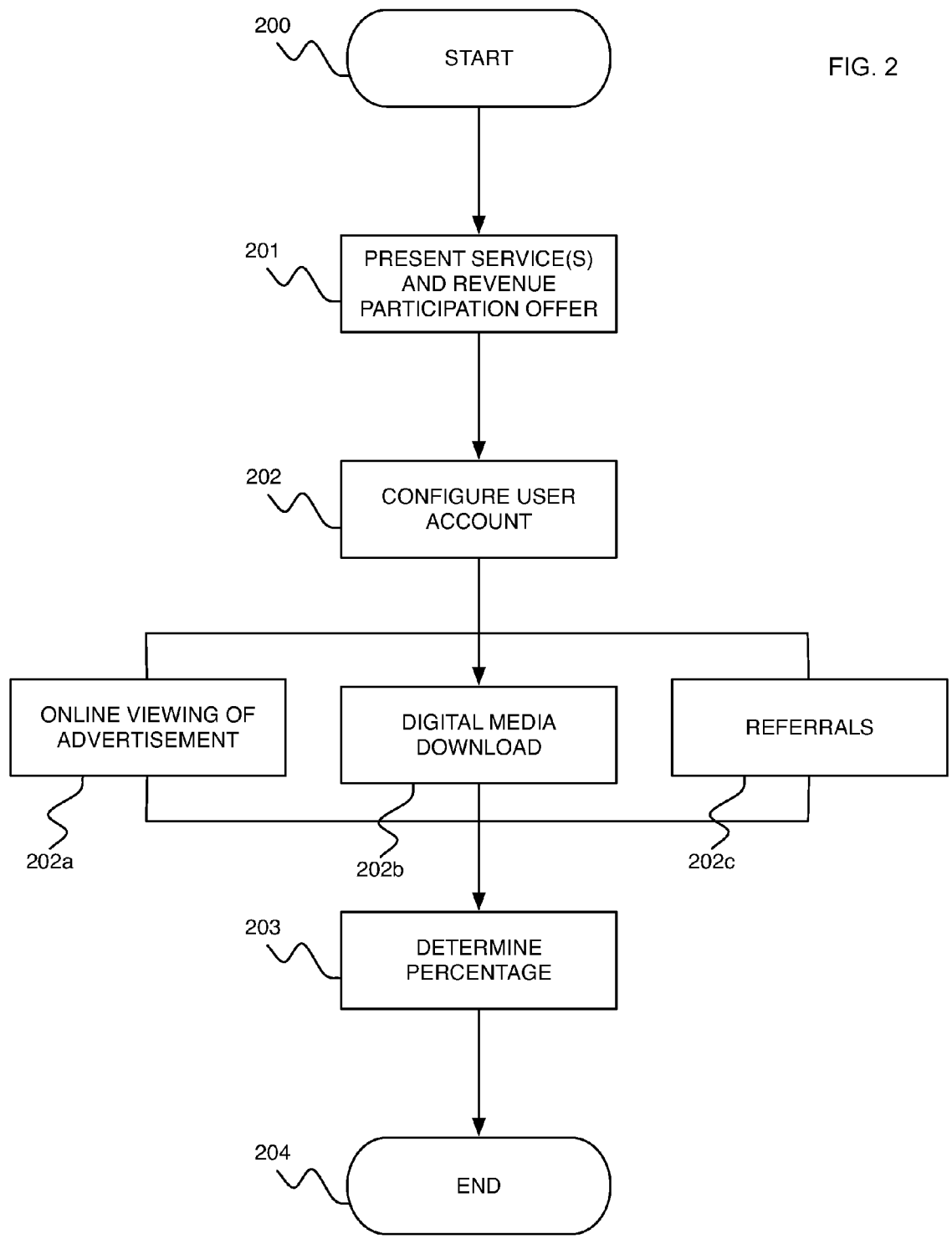
FIG. 2 is a flow diagram that illustrates an embodiment of revenue participation process.

FIG. 2 is a flow diagram that illustrates an embodiment of revenue participation process. Processing starts at 200. Revenue participation and service offer is presented at 201. Embodiments of the invention that present offers to a user can be implemented using any graphical user interface or web interface configured to obtain data from a server and present the data to a plurality of users. The presentation of offer 201 allows selected artist to opt into one or more service. An offer may be dynamically generated during the presentation depending on availability of one or more service and whether the offer of a service has a different threshold value or condition (e.g. sponsor looking for a winner of a music audition of a specific genre). Upon accepting offer, the user account of artist is configured at step 202 to allow a database to record on the user account and track scores or instances of one or a combination of revenue-generating sub processes such as online viewing of advertisement on the user's media content (e.g., webpage) 203a, digital media download of artist's performance data 203b, and/or online referrals initiated by the selected artist 203c.

Determination of percentage for apportioning revenue takes place periodically at step 203. Percentage is based on a sliding scale in which higher percentage of revenue is apportioned to the user account for a higher number of advertisement viewings 203a, digital downloads 203b, and referrals 203c. The determination of percentage may give a greater weight to one or more scores tracked from, for example, advertisement viewing 203a and digital media download of the artist's performance data 203b.

It will be appreciated that the above processes, and steps thereof, may be realized in hardware, software, or any combination of these suitable for a particular application. The hardware may include a server, general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device that may be configured to process electronic signals. It will further be appreciated that the process may be realized as computer executable code created using a structured programming language, an object oriented programming language, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across a computer in a number of ways, or all of the functionality may be integrated into hardware. All such permutations and combinations are intended to fall within the scope of the present disclosure.

While the invention herein disclosed has been described by means of specific embodiments and applications thereof, numerous modifications and variations could be made thereto by those skilled in the art without departing from the scope of the invention set forth in the claims.

What is claimed is:

1. A system for providing performance data to an online community for outcome determinative feedback comprising:
    a data repository for storing said-recorded performance data of an artist; and,
    a server configured to:
        associate said performance data with a profile of said artist;
        present said performance data to an online community having access to said performance data;
        obtain feedback from at least one user with respect to said performance data;
        determine that a selected artist meets a threshold value or condition;
        offer service and revenue participation to said selected artist;
        deliver content items associated with said selected artist and one or more advertisements to said online community;
        calculate an advertisement score for a subsequent online community interaction with said one or more advertisements associated with said content item associated with said selected artist and a performance download score for online community download of a performance data for sale of said selected artist;
        accounts established by members referred by said selected artist;
        enable a process of providing one or more services to said selected artist; and,
        apportion revenue to said selected artist based on said advertisement score and said performance download score.

2. A non-transitory computer-readable medium comprising computer-readable instructions for apportioning revenue for media content, wherein execution of said computer-readable instructions by one or more processors causes said one or more processors to carry out steps comprising:
    obtaining a media file comprising a work of authorship associated with an author;
    storing said media file in a tangible, non-transitory computer-readable medium accessible by one or more computers over a network;
    associating said media file with an account associated with said author;
    presenting said media file to an online community comprising a plurality of users;
    obtaining feedback on said work of authorship from at least one user of said plurality of users;
    determining that a threshold condition based on said feedback has been met;
    presenting a revenue participation offer based on said threshold condition to said account;
    delivering advertisement content along with said media file to said online community after acceptance of said revenue participation offer;
    calculating an advertisement score based on at least one revenue-generating activity comprising subsequent online community interaction with said media file; and
    apportioning revenue to said author based at least in part on said advertisement score.

3. The computer-readable medium of claim 2, wherein said work of authorship comprises performance data.

4. The computer-readable medium of claim 2, wherein said work of authorship comprises online commentary.

5. The computer-readable medium of claim 2, wherein said work of authorship comprises a music video.

6. The computer-readable medium of claim 2, wherein said work of authorship comprises at least one of audio, video and text.

7. The computer-readable medium of claim 2, wherein determining that said threshold condition has been met is based on a plurality of media files associated with said account of said author, and wherein said revenue participation offer is made to said author associated with said account.

8. The computer-readable medium of claim 7, further comprising delivering advertisement content along with said plurality of media files associated with said account of said author, wherein said revenue-generating activity further comprises subsequent online community interaction with said plurality of media files.

9. The computer-readable medium of claim 2, wherein determining that said threshold condition has been met is based on said media file, and wherein said revenue participation offer is made on a file-by-file basis for each media file associated with said account of said author.

10. The computer-readable medium of claim 2, wherein said computer-readable instructions further comprise offering said author one or more services after determining said threshold condition is met.

11. The computer-readable medium of claim 10, wherein said computer-readable instructions further comprise offering said author one or more additional services after determining a second threshold condition has been met.

12. The computer-readable medium of claim 10, wherein said apportioning said revenue further comprises calculating a portion of revenue generated through one said or more services.

13. The computer-readable medium of claim 2, wherein said apportioning said revenue is based on a sliding scale that adjusts automatically to advertisement revenue generated by said media file.

14. The computer-readable medium of claim 2, wherein said apportioning said revenue is based on a sliding scale that adjusts automatically to advertisement revenue generated by said author.

15. The computer-readable medium of claim 2, wherein said apportioning said revenue is based on a fixed percentage.

16. the computer-readable medium of claim 2, wherein said computer-readable instructions further comprise calculating a popularity score based on at least one measure of popularity, wherein said apportioning said revenue is further based on said popularity score.

17. The computer-readable medium of claim 2, wherein said computer-readable instructions further comprise calculating a referral score based on new user accounts established by referral to said online community, wherein said apportioning said revenue is further based on said referral score.

18. The computer-readable medium of claim 2, wherein said computer-readable instructions further comprise calculating a distribution score based on purchase or licensing of said work of authorship, wherein said apportioning said revenue is further based on said distribution score.

19. A non-transitory, computer-readable medium comprising computer-readable instructions for apportioning revenue for media content, wherein execution of said computer-readable instructions by one or more processors causes said one or more processors to carry out steps comprising:

obtaining a media file comprising a work of authorship associated with an author;

storing said media file in a non-transitory, tangible, computer-readable medium accessible over a network;

associating said media file with an account associated with said author;

presenting said media file over said network to an online community comprising a plurality of users;

presenting a revenue participation offer to said author;

delivering advertisement content along with said media file to said online community after acceptance of said revenue participation offer by said author;

calculating an advertisement score based on at least one revenue-generating activity comprising subsequent online community interaction with said media file; and apportioning revenue to said author based on said advertisement score.

20. The computer-readable medium of claim 19, wherein said computer-readable instructions further comprise:

obtaining feedback on said work of authorship from at least one user of said plurality of users; and determining that a threshold condition based on said feedback has been met, wherein said revenue participation offer is presented after he said threshold condition is met.

* * * * *